US008968891B2

(12) United States Patent
Makino et al.

(10) Patent No.: US 8,968,891 B2
(45) Date of Patent: Mar. 3, 2015

(54) METALLIC GLASS, MAGNETIC RECORDING MEDIUM USING THE SAME, AND METHOD OF MANUFACTURING THE MAGNETIC RECORDING MEDIUM

(71) Applicants: Akihiro Makino, Miyagi (JP); Akihisa Inoue, Miyagi (JP); Wei Zhang, Miyagi (JP); Hisamichi Kimura, Miyagi (JP)

(72) Inventors: Akihiro Makino, Miyagi (JP); Akihisa Inoue, Miyagi (JP); Wei Zhang, Miyagi (JP); Hisamichi Kimura, Miyagi (JP)

(73) Assignee: Japan Science and Technology Agency, Saitama (JP)

( * ) Notice: Subject to any disclaimer, the term of this patent is extended or adjusted under 35 U.S.C. 154(b) by 105 days.

(21) Appl. No.: 13/728,849

(22) Filed: Dec. 27, 2012

(65) Prior Publication Data

US 2013/0118645 A1 May 16, 2013

Related U.S. Application Data

(62) Division of application No. 12/678,291, filed as application No. PCT/JP2008/066793 on Sep. 17, 2008, now Pat. No. 8,377,580.

(30) Foreign Application Priority Data

Sep. 18, 2007 (JP) ................................. 2007-241595

(51) Int. Cl.
  *G11B 5/65* (2006.01)
  *C22C 45/00* (2006.01)
  (Continued)

(52) U.S. Cl.
  CPC .............. *G11B 5/653* (2013.01); *C22C 45/003* (2013.01); *C22C 33/003* (2013.01); *C22C 45/02* (2013.01); *G11B 5/855* (2013.01); *H01F 10/131* (2013.01); *H01F 41/34* (2013.01); *H01F 1/01* (2013.01)
  USPC ....................................................... 428/836.3

(58) Field of Classification Search
  None
  See application file for complete search history.

(56) References Cited

U.S. PATENT DOCUMENTS

| 4,668,310 A | * | 5/1987 | Kudo et al. ................... 148/304 |
| RE32,925 E | | 5/1989 | Chen et al. |

(Continued)

FOREIGN PATENT DOCUMENTS

| JP | 11071645 A | * | 3/1999 |
| JP | 2008-130210 A | | 6/2008 |

OTHER PUBLICATIONS

Derwent Abstract Translation of JP2010-165393 A (Derwent-ACC-No. 2010-J69160) (pub. 2010).

Aoyama et al., "Fabrication and magnetic properties of patterned magnetic recording media", Oyo Buturi, 2003, vol. 72, No. 3, pp. 298-303.

(Continued)

*Primary Examiner* — Kevin Bernatz
(74) *Attorney, Agent, or Firm* — Chen Yoshimura LLP

(57) ABSTRACT

A magnetic recording medium 1 includes a substrate 11; and a metallic glassy layer 12 that is arranged on the substrate 11 and has a plurality of convex portions 12A and concave portions 12B. The metallic glassy layer 12 has a chemical composition represented by any one of the formulae (1) to (3):

$Fe_mPt_nSi_xB_yP_z$ (wherein, $20 < m \leq 60$ at %, $20 < n \leq 55$ at %, $11 \leq x < 19$ at %, $0 \leq y < 8$ at %, and $0 < z < 8$ at %)  (1);

$Fe_{55}Pt_{25}(Si_xB_yP_z)_{20}$ (wherein, $11 \leq x < 19$ at %, $0 \leq y < 8$ at %, and $0 < z < 8$ at %)  (2); and $(Fe_{0.55}Pt_{0.25}Si_{0.16}B_{0.02}P_{0.02})_{100-x}M_x$ (wherein, $0 < X \leq 6$ at %; and M represents an element or a combination of any two or more of the elements selected from Zr, Nb, Ta, Hf, Ti, Mo, W, V, Cr, Mn, Al, Y, Ag, and rare earth elements.)  (3).

15 Claims, 18 Drawing Sheets

(51) Int. Cl.
   *C22C 33/00*   (2006.01)
   *C22C 45/02*   (2006.01)
   *G11B 5/855*   (2006.01)
   *H01F 10/13*   (2006.01)
   *H01F 41/34*   (2006.01)
   *H01F 1/01*    (2006.01)

(56) References Cited

U.S. PATENT DOCUMENTS

| | | | | |
|---|---|---|---|---|
| 4,985,089 | A * | 1/1991 | Yoshizawa et al. | 148/303 |
| 5,340,413 | A | 8/1994 | Martis | |
| 5,738,733 | A | 4/1998 | Inoue | |
| 5,911,840 | A * | 6/1999 | Couderchon et al. | 148/121 |
| 6,183,889 | B1 * | 2/2001 | Koshiba et al. | 428/812 |
| 7,141,127 | B2 * | 11/2006 | Yoshizawa | 148/307 |
| 7,560,001 | B2 | 7/2009 | Peker | |
| 7,582,172 | B2 * | 9/2009 | Schroers et al. | 148/403 |
| 7,582,173 | B2 * | 9/2009 | Park et al. | 148/403 |
| 7,585,542 | B2 | 9/2009 | Sutardja | |
| 8,325,987 | B2 * | 12/2012 | Ito et al. | 382/106 |
| 2007/0107467 | A1 * | 5/2007 | Miwa et al. | 65/30.13 |

OTHER PUBLICATIONS

Inoue et al., "Nanocrystalline Fe—Pt—B base hard magnets with high coercive force obtained from amorphous precursor", Journal of Applied Physics, May 11, 2005, 97, 10H308.

Kubota et al., "Tetsu-Hankinzokukei Kyojisei Bulk Kinzoku Glass no Sosei to sono Glass Keiseino", Abstracts of the Japan Institute of Metals, Mar. 27, 2007, vol. 140, p. 417.

Kubota et al., "Glass Sen 'i Gensho o Shimesu FePt-ki Jisei Kinzoku Glass no Sosei", Abstracts of the Japan Institute of Metals, Mar. 26, 2008, vol. 142, p. 224.

Fukuda et al., "FIB-W Deposition Patterning ni yoru Nano Kanagata no Sosei to Kinzoku Glass no Nanoimprint", Heisei 18 Nendo Sosei Kako Shunki Koenkai Koen Ronbunshu, May 10, 2006, pp. 277-278.

Fukuda et al., "Kinzoku Glass no 50nm Nanoimprint Seikei ni Okeru Kanagata to Seikei Zairyo no Kyodo", 2006 Nendo Nenji Taikai Koen Ronbunshu, The Japan Society of Mechanical Engineers, Sep. 15, 2006, vol. 1, pp. 165-166.

International Search Report (ISR) issued in PCT/JP2008/066793 of the parent U.S. Appl. No. 12/678,291, mailed in Dec. 2008.

Written Opinion (PCT/ISA/237) issued in PCT/JP2008/066793 of the parent U.S. Appl. No. 12/678,291, mailed in Dec. 2008.

* cited by examiner

METALLIC GLASS, MAGNETIC RECORDING MEDIUM USING THE SAME, AND METHOD OF MANUFACTURING THE MAGNETIC RECORDING MEDIUM

This application is a divisional of a pending application, U.S. Ser. No. 12/678,291 filed on Jul. 8, 2010, which is the National Stage Application of PCT International Application No. PCT/JP2008/066793, both of which are hereby incorporated by reference in their entireties.

TECHNICAL FIELD

The present invention relates to a metallic glass, more specifically, the metallic glass having a chemical composition $Fe_mPt_n(Si_xB_yP_z)$, a magnetic recording medium using the same, and a method of manufacturing the magnetic recording medium.

BACKGROUND ART

With the development of advanced information society in recent years, the need for larger capacity image information recording is increasing, and a surface recording density as high as 1 Terabit per square inch ($Tb/inch^2$) is required for magnetic recording media. As a magnetic recording medium providing such high recording density, a patterned magnetic recording medium, which isolates magnetic dots using a nonmagnetic material, has been a focus of attention (See Non-patent Reference 1.).

The technique described in Non-patent Reference 1 uses a mask on which resist is patterned by the nanoimprint technology, and isolates magnetic dots by etching a magnetic film using this mask.

It is known that a rapidly quenched Fe—Pt—B alloy ribbon has a double-phase structure consisting of a uniform nanosized amorphous phase and a fcc($\gamma$)-FePt phase, and that structure transforms into a nanostructure exhibiting good hard magnetic property by heat treatment (See Non-patent Reference 2.).

[Non-patent Reference 1] Tsutomu AOYAMA, Isamu SATO, Shunji ISHIO, "Fabrication and magnetic properties of patterned magnetic recording media", OYO BUTURI, 2003, Vol. 72, No. 3, pp. 298-303

[Non-patent Reference 2] A. Inoue and W. Zhang, J. Appl. Phys., 97, 10H308, 2005

DISCLOSURE OF THE INVENTION

Problems to be Solved by the Invention

With the conventional patterned magnetic recording media as described in Non-patent Reference 1, since the resist is nanoimprinted, dot pitch is as large as 100 nm or larger. It is therefore difficult to achieve a surface recording density as high as 1 $Tb/inch^2$. In addition, each of the magnetic recording media must undergo a series of fabrication processes as described in Non-patent Reference 1, which increases the processing cost.

Accordingly, the object of present invention is directed to provide a metallic glass, a magnetic recording medium using the metallic glass, and a method of manufacturing the magnetic recording medium that substantially obviate above mentioned problems due to limitations and disadvantages of the related arts.

Means to Solving the Problems

To achieve the above objectives, the present invention provides a metallic glass characterized in that its chemical composition is represented by formula (1) as shown below.

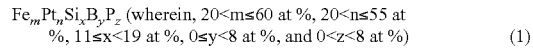

$Fe_mPt_nSi_xB_yP_z$ (wherein, $20 < m \leq 60$ at %, $20 < n \leq 55$ at %, $11 \leq x < 19$ at %, $0 \leq y < 8$ at %, and $0 < z < 8$ at %)     (1)

The metallic glass represented by the above formula preferably has a chemical composition represented by formula (2) as shown below.

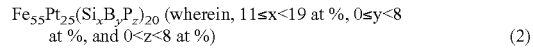

$Fe_{55}Pt_{25}(Si_xB_yP_z)_{20}$ (wherein, $11 \leq x < 19$ at %, $0 \leq y < 8$ at %, and $0 < z < 8$ at %)     (2)

An another metallic glass of the present invention is characterized in that its chemical composition is represented by formula (3) as shown below.

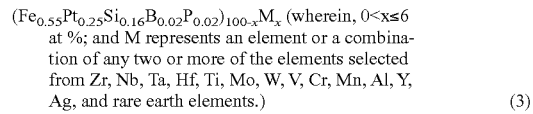

$(Fe_{0.55}Pt_{0.25}Si_{0.16}B_{0.02}P_{0.02})_{100-x}M_x$ (wherein, $0 < x \leq 6$ at %; and M represents an element or a combination of any two or more of the elements selected from Zr, Nb, Ta, Hf, Ti, Mo, W, V, Cr, Mn, Al, Y, Ag, and rare earth elements.)     (3)

In the chemical composition of the metallic glass represented by formula (3), M may be substituted by Zr. In the chemical composition of the metallic glass represented by formulae (1) to (3), a part of Fe may be substituted by Co or Ni, and a part of Pt can be substituted by Pd.

In another aspects, the present invention provides a magnetic recording medium characterized in that it comprising: a substrate; and a metallic glass layer, which is formed on the substrate and has a plurality of concave portions and convex portions, and the metallic glass layer is made of a metallic glass having a chemical composition represented by formula (1) as shown below, wherein concave portions are consisting of a soft magnetic layer, and convex portions are consisting of a hard magnetic layer.

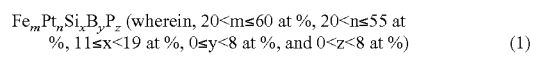

$Fe_mPt_nSi_xB_yP_z$ (wherein, $20 < m \leq 60$ at %, $20 < n \leq 55$ at %, $11 \leq x < 19$ at %, $0 \leq y < 8$ at %, and $0 < z < 8$ at %)     (1)

Preferably, the chemical composition is represented by formula (2) as shown below.

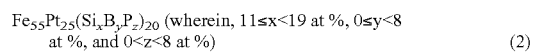

$Fe_{55}Pt_{25}(Si_xB_yP_z)_{20}$ (wherein, $11 \leq x < 19$ at %, $0 \leq y < 8$ at %, and $0 < z < 8$ at %)     (2)

Furthermore, the metallic glass may have a chemical composition represented by formula (3) as shown below.

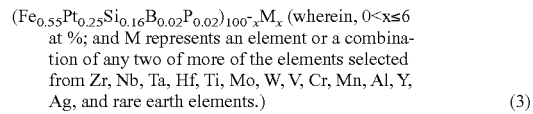

$(Fe_{0.55}Pt_{0.25}Si_{0.16}B_{0.02}P_{0.02})_{100-x}M_x$ (wherein, $0 < x \leq 6$ at %; and M represents an element or a combination of any two of more of the elements selected from Zr, Nb, Ta, Hf, Ti, Mo, W, V, Cr, Mn, Al, Y, Ag, and rare earth elements.)     (3)

In the above chemical composition, the concave portions and convex portions preferably has a surface protective layer covered with a nonmagnetic material, and the surface of the surface protective layer is flat. The concave portions and convex portions are preferably aligned in a matrix, houndstooth-check, or line sequence pattern.

In the chemical composition of the metallic glass represented by formula (3) as shown above, M may be substituted by Zr. In the chemical composition of the metallic glass represented by formulae (1) to (3) shown above, a part of Fe may be substituted by Co or Ni, and a part of Pt may be substituted by Pd.

In another aspects, the present invention provides a method of manufacturing a magnetic recording medium characterized in that it comprises steps: of forming a metallic glass layer on a substrate; forming concave portions and convex portions on the metallic glass layer using a mold; and processing a heat treatment of the convex portions of the metallic glass layer to have a hard magnetic property, wherein the metallic glass layer has a chemical composition represented by formula (1) as shown below.

$$Fe_mPt_nSi_xB_yP_z \text{ (wherein, } 20<m\leq60 \text{ at \%, } 20<n\leq55 \text{ at \%, } 11\leq x<19 \text{ at \%, } 0\leq y<8 \text{ at \%, and } 0<z<8 \text{ at \%)} \quad (1)$$

The metallic glass preferably has a chemical composition represented by formula (2) as shown below.

$$Fe_{55}Pt_{25}(Si_xB_yP_z)_{20} \text{ (wherein, } 11\leq x<19 \text{ at \%, } 0\leq y<8 \text{ at \%, and } 0<z<8 \text{ at \%)} \quad (2)$$

More preferably, the metallic glass may have a chemical composition represented by formula (3) as shown below.

$$(Fe_{0.55}Pt_{0.25}Si_{0.16}B_{0.02}P_{0.02})_{100-x}M_x \text{ (wherein, } 0<x\leq6 \text{ at \%; and M represents an element or a combination of any two of more of the elements selected from Zr, Nb, Ta, Hf, Ti, Mo, W, V, Cr, Mn, Al, Y, Ag, and rare earth elements.)} \quad (3)$$

In the chemical composition of the metallic glass represented by formula (3) as shown above, M may be substituted by Zr. The temperature of the heat treatment of the convex portions on the metallic glass layer preferably falls within the 750° C. to 850° C. range, and heat treatment may be processed for 10 to 30 minutes.

Effects of the Invention

According to the present inventions of the metallic glass, the magnetic recording medium using the same, and the method of manufacturing the magnetic recording medium, finer concave portions and convex portions can be formed on a ferromagnetic layer made of the metallic glass. Furthermore, since the ferromagnetic material at the convex portions only can be made to form a hard magnetic layer, the packing density of the magnetic recording medium can be improved.

DESCRIPTION OF REFERENCE NUMERALS

Figure 1:
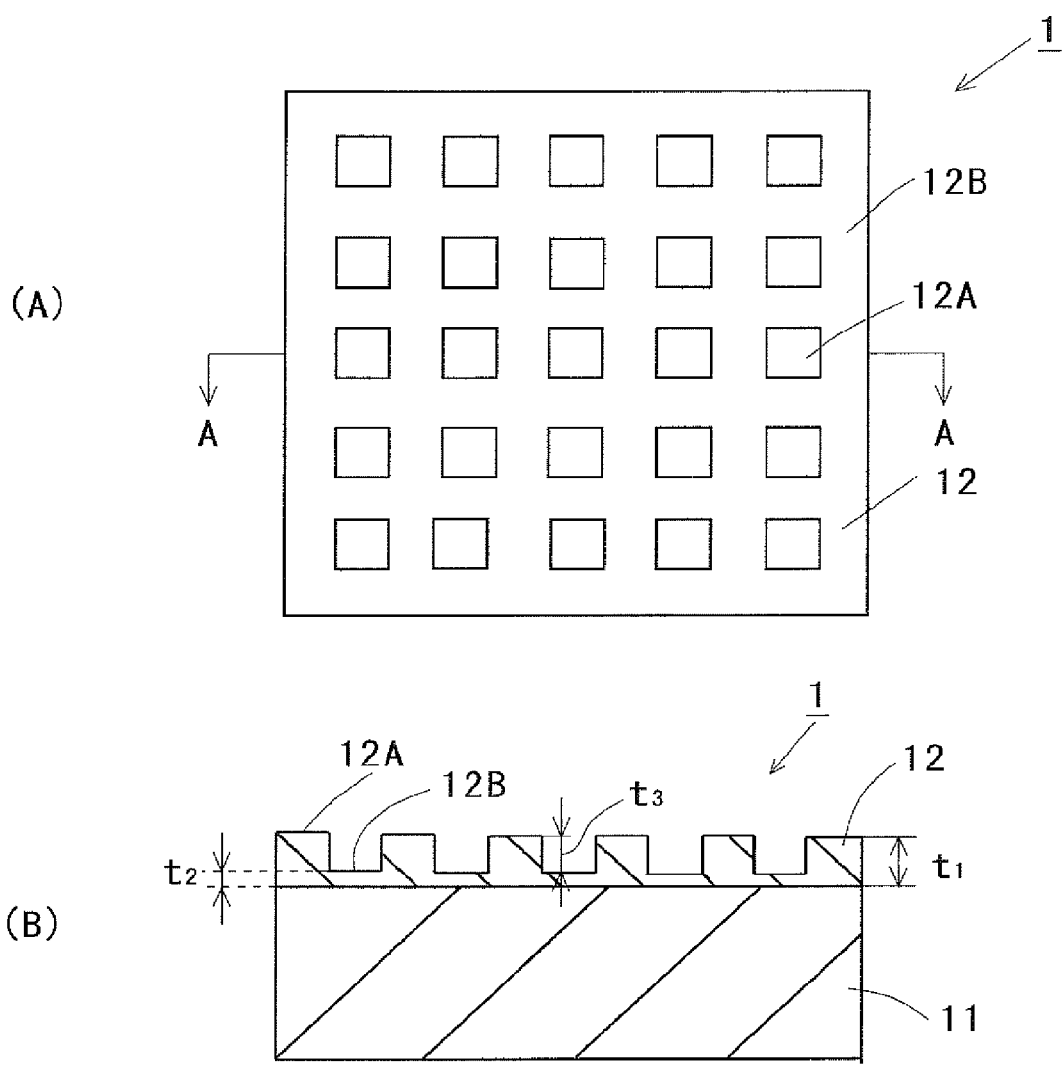
FIG. 1 illustrates the embodiment of magnetic recording medium 1 in accordance with an embodiment of the present invention, in which (A) is a plain view, and (B) is a cross-sectional view taken along the line A-A in (A)

1: Magnetic recording medium
11: Substrate
12: metallic glass layer
12A: Convex portion
12B: Concave portion
13: Surface protective layer
15: Mold
15A: Convex portion
15B: Concave portion
20: Substrate
21: $SiO_2$ film
22: Mask pattern
25: Convex portion

BEST MODES FOR CARRYING OUT THE INVENTION

Hereinafter, various embodiments of the present invention will be described in detail with reference to the figures. The same characters are used to designate same or corresponding components in each figure.

First, favorable forms of the metallic glass of the present invention are described.

A metallic glass of the present invention is a permanent magnet material having a chemical composition represented by formula (1) as below.

$$Fe_mPt_nSi_xB_yP_z \text{ (wherein, } 20<m\leq60 \text{ at \%, } 20<n\leq55 \text{ at \%, } 11\leq x<19 \text{ at \%, } 0\leq y<8 \text{ at \%, and } 0<z<8 \text{ at \%)} \quad (1)$$

The chemical composition of the metallic glass of the present invention is preferably represented by formula (2) shown below.

$$Fe_{55}Pt_{25}(Si_xB_yP_z)_{20} \text{ (wherein, } 11\leq x<19 \text{ at \%, } 0\leq y<8 \text{ at \%, and } 0<z<8 \text{ at \%)} \quad (2)$$

The metallic glass of the present invention may have a chemical composition represented by formulae (3) shown below.

$$(Fe_{0.55}Pt_{0.25}Si_{0.16}B_{0.02}P_{0.02})_{100-x}M_x \text{ (wherein, } 0<x\leq6 \text{ at \%; and M represents an element or a combination of any two of more of the elements selected from Zr, Nb, Ta, Hf, Ti, Mo, W, V, Cr, Mn, Al, Y, Ag, and rare earth elements.)} \quad (3)$$

Addition of M in the above composition further enhances the metallic glass-forming ability. A preferable material as M is Zr, for example. In this case, it is possible to enhance metallic glass-forming ability even if the composition X of $M_X$ exceeds 6 at %. However, since the magnetic property of the metallic glass $(Fe_{0.55}Pt_{0.25}Si_{0.16}B_{0.02}P_{0.02})_{100-x}$ decreases, which is not desirable, it is preferable to use the metallic glass $(Fe_{0.55}Pt_{0.25}Si_{0.16}B_{0.02}P_{0.02})_{96}Zr_4$ to obtain sufficient magnetic property.

A part of Fe of the metallic glassy alloys represented by formulae (1) to (3) shown above can be substituted by Co or Ni, both of which are ferromagnetic elements similar to Fe.

A part of Pt of the metallic glassy alloys represented by formulae (1) to (3) shown above can be substituted by Pd for forming $L1_0$-FePd phase, which will be described later.

The metallic glass of the present invention represented by formulae (1) to (3) as shown above has ferromagnetic property. This metallic glass exhibit soft magnetic property immediately after the formation, but after annealing at high-temperature for a predetermined period of time, the metallic glass of the present invention exhibits hard magnetic property due to crystallization.

The metallic glasses of the present invention can be produced from master alloys, obtained by melting in a radio-frequency melting furnace and an arc melting furnace, by the single-roll melt spinning method.

The metallic glass of the present invention is an alloy obtained by adding Si to Fe—Pt—B-P alloy, which has been found to have good magnetic properties by previous research. By adding Si to the above alloy according to the present invention, amorphous-forming ability can be further enhanced. When a melt-spun ribbon is subjected to heat treatment, a composite structure consisting of $L1_0$-FePt phase, $Fe_2B$ phase, PtSi phase, and FeSi phase is formed, and the annealed melt-spun ribbon exhibits hard magnetic properties because of the $L1_0$-FePt phase. The alloy that exhibits most favorable amorphous-forming ability has residual magnetic flux density (Br) of approximately 0.69 T, coercive force (Hc) of 172 kA/m, and maximum energy product of 44 kJ/m$^3$.

It is preferable that the metallic glass of the present invention is produced by the quenching method having high cooling rate. By cooling a molten material at high cooling rate, finer magnetic particles and a non-equilibrium phase can be formed in the metallic glassy matrix. Specifically, by rapidly quenching the molten material, non-equilibrium phases such as supersaturated solid solution, namely the state in which added elements such as B and Si are forcibly dissolved into the metallic glass, and amorphous phase, can be formed easily. These non-equilibrium phases can be transformed into a more stable $L1_0$-FePt phase easily, and as a result, high coercive force can be obtained.

As a rapid quenching method, it is preferable to use the liquid quenching method, such as single-roll method, double-roll method, and centrifugal quenching method, and the gas-phase quenching method, such as sputtering method and vacuum deposition method. By the liquid quenching method, which is known to be useful for manufacturing an amorphous alloy, for example, cooling is performed at the cooling rate as high as 100 K/sec. Consequently, this method is also effective for non-amorphous alloys to obtain finer crystal grain size and a non-equilibrium phase by the effect of rapid quenching. By the gas-phase cooling method, whose cooling rate is as high as or higher than that of the liquid cooling method, allows finer crystal grain size and a non-equilibrium phase to be obtained.

When the metallic glass of the present invention is manufactured by the liquid quenching, melt-spinning method, continuous or discontinuous glassy ribbons in thickness of several μm to several dozen μm can be obtained. The ribbons obtained in this way can also be crushed into powder. The thin metallic glassy ribbons are ideal as a permanent magnet material for small magnetic parts, with which processing of bulk materials incurs high cost and results in degradation of magnetic property, for example.

The metallic glassy powder obtained by the present invention is ideal as a bonded magnet material, mixed with resin, etc., for example.

According to the present invention, a metallic glassy thin film having thickness of several nm to several dozen nm can be formed on a substrate by the gas-phase quenching method. The thin film thus formed on a substrate is ideal as a medium for high-density magnetic recording. Thus, the hard magnetic property can be obtained by without requiring heat treatment or by crystallization by heat treatment at nearly 800 K. Consequently, inexpensive oxide-glass substrates can be used. With the metallic glass of the present invention, since the growth of crystal grains is suppressed, a very fine crystalline structure can be obtained, which allows the metallic glass of the present invention to satisfy the requirements of high-density magnetic recording media.

It is preferable that heat treatment for crystallization is processed at the temperature around 800 K, specifically from approximately 750 K to 850 K. heat treatment processed at a temperature lower than 750 K is not preferable because crystallization does not advance and good hard magnetic property cannot be obtained. In the heat treatment processed at 750 K or higher, with the increase of the annealing temperature, crystallization advances and coercive force increases, thus providing hard magnetic property. In the heat treatment processed at 850 K or higher, since the coercive force is saturated, further temperature increase is not necessary.

It is desirable that heat treatment is processed for the time of approximately 10 to 30 minutes under the above annealing conditions. Heat treatment processed for less than 10 minutes is not preferable because crystallization does not advance and consequently hard magnetic property cannot be obtained. On the other hand, the heat treatment processed for longer than 30 minutes, the coercive force due to crystallization is saturated, and so the duration of heat treatment need not be increased further.

FIG. 1 illustrates an embodiment of magnetic recording medium 1 of the present invention, in which (A) is a plain view, and (B) is a cross-sectional view taken along the line A-A in (A). Magnetic recording medium 1 of the present invention comprises: a substrate 11; and a metallic glassy layer 12, which is provided on the substrate 11 and has a plurality of concave portion and convex portion. The plurality of concave portion 12B are a soft magnetic layer. At least outer most surface of the plurality of convex portion 12A are consisting of a hard magnetic layer that allows magnetic recording to be made. For the metallic glassy layer 12, a metallic glass having a chemical composition represented by the above formulae (1) and (2) can be used.

A pitch P of the convex portions 12A is identical to that of a pitch P of concave portions 12B as shown in FIG. 1, and is set to be approximately 25 nm. The height $t_3$ of the convex portions 12A is set to be approximately 25 nm.

By the way, oxide glasses are used for substrates for conventional magnetic recording media, namely a hard disk for Hard Disk Drive. According to the present invention, a metallic glass may be used as the substrate 11. When a metallic glass is used as the substrate 11, bulk metallic glassy material is sandwiched between tools, and by pressing the bulk material while maintaining it within the supercooled liquid temperature region, a substrate 11 having a desired thickness can be formed.

At this time, the surface of a mold is mirror-finished by using a chemical mechanical polishing (CMP) equipment.

The load of the press work can be minimized by performing press work within the supercooled liquid temperature region of the metallic glass. The mirror-finished surface of the mold is copied to the surface of the substrate 11 with mirror accuracy, allowing the substrate 11 to have uniform thickness having excellent evenness or smoothness. Consequently, a metallic glassy substrate that has undergone press working only can be used as the substrate 11, which reduces the machining cost of the substrate 11. The metallic glassy substrate 11 thus formed can be used not only as a magnetic recording medium but also as a light weight substrate for DVDs, CDs, and HDs.

The metallic glass, which is an amorphous alloy, is high in strength, flexible, and has excellent anti-corrosion characteristics. Consequently, the substrate 11 can be made thin, allowing reduction in size and weight of the magnetic recording medium 1. The magnetic recording medium in the embodiment of the present invention can be used not only for information recording but also as a scale for magnetic recording media on the order of nanometer (nm).

Figure 2:
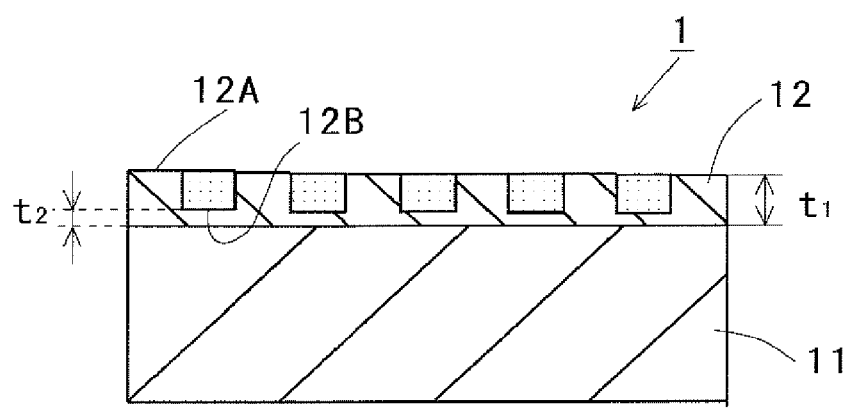
FIG. 2 is a cross-sectional view illustrating a typical variation of the magnetic recording medium of the present invention.

FIG. 2 is a cross-sectional view illustrating a modified embodiment of the magnetic recording medium of the present invention. The magnetic recording medium as shown in FIG. 2 differs from that as shown in FIG. 1 that a surface protective layer 13 made of a nonmagnetic material is provided on convex portions 12A and concave portions 12B. The surface protective layer 13 can cover the concave portions 12B only, or the concave portions 12B can be filled in and covered along with the surface of the convex portions 12A. The surface protective layer 13 can remain flat. As a material for the surface protective layer 13, a $SiO_2$ film, etc. can be used.

Figure 3:
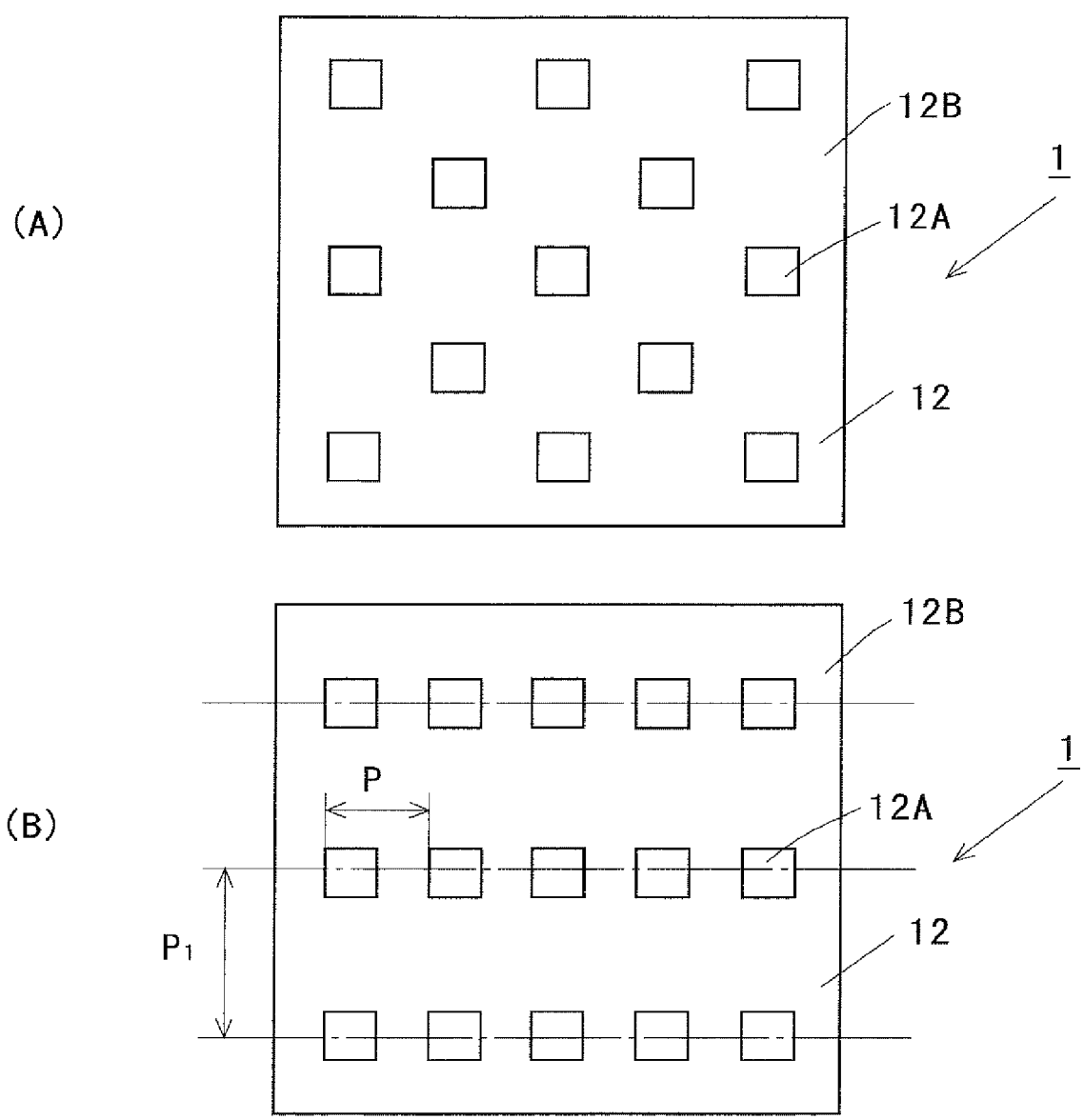
FIG. 3 illustrates an another sequence pattern of the convex portions, in which (A) shows a houndstooth-check pattern, and (B) shows a line pattern.

FIG. 3 illustrates an another sequence pattern of convex portions 12A as shown in FIG. 1. FIG. 3(A) shows a houndstooth-check pattern, and FIG. 3(B) shows a line shaped pattern. The pitch P of the sequence pattern as shown in FIG. 3(A) is the same as the pattern as shown in FIG. 1, however the pitch between lines P1 is set to be larger than the pitch P. The convex portions 12B can also be arranged in a houndstooth-check pattern or line shaped pattern as in the case of convex portions 12A.

The concave portions 12B and the convex portions 12A can also be made into any patterns at need or arbitrary other than the matrix, houndstooth-check, and line patterns described above. According to the present embodiment, since nanoimprint technology is employed to form the concave portions 12B and convex portions 12A on the metallic glassy layer 12 in an supercooled liquid temperature region as described later, high-precision formation of nano-ordered concave and convex portions can be possible. High-density magnetic recording media can thus be formed highly accurately. In addition, since concave portions 12B and convex portions 12A can be formed just by performing press work, processing time and cost can be minimized.

In the magnetic recording medium 1 as shown in FIG. 1, the convex portions 12B consisting of a soft magnetic layer exist surrounding the convex portions 12A, which surface consisting of a hard magnetic layer. The concave portions 12B formed by a soft magnetic layer have the function to support the recording magnetic field from a magnetic head. Since the recording magnetic field of the magnetic head forms a closing loop while going through the convex portions 12B, fetching of the recording magnetic field and the sensitivity of reading signal can be improved.

Furthermore, since the convex portions 12B have a surface protective layer 13 covered with a nonmagnetic material, each of the hard magnetic layer of the convex portions 12A serves as a magnetically independent recording bit.

A nonmagnetic material such as aluminum, oxide glass, and metallic glass can be used as the substrate 11. As described later, the temperature of the entire substrate 11 is increased to the molding temperature Tm during the manufacturing process. When the substrate 11 is an amorphous material, amorphous material in which crystallization temperature is higher than the molding temperature Tm should be adopted.

The thickness $t_1$ of the entire metallic glassy layer 12 is approximately 20 nm, and the thickness $t_2$ of the concave portions 12B is approximately several nm. The area other than the hard magnetic layer of the metallic glassy layer 12 is a soft magnetic layer. This soft magnetic layer corresponds to an interlayer of a conventional perpendicular magnetic recording medium. The recording density as high as 1 $Tb/inch^2$ can be achieved by keeping the pitch P of the concave portions 12B formed in matrix sequence to be approximately 25 nm. The pitch P of the concave portions 12B is determined by the accuracy of the mold used for nanoimprint molding described previously. When the mold is formed by using ion beam, etc, the pitch P can be reduced to the order of 10 nm. In this case, the recording density of the magnetic recording medium 1 will be increased up to several $Tb/inch^2$.

Now, the method of manufacturing the magnetic recording medium 1 according to the present invention will be explained below.

Figure 4:
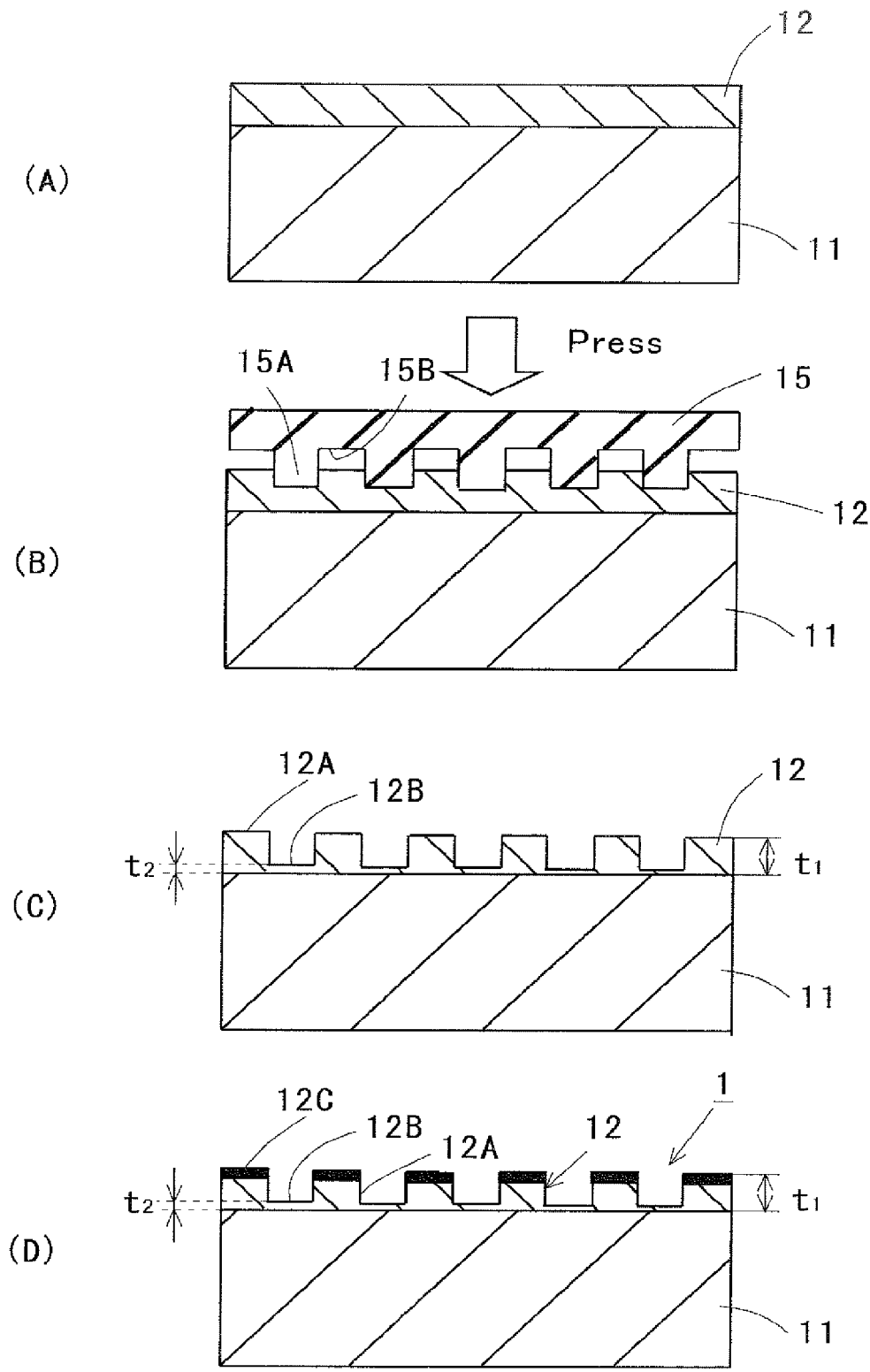
FIG. 4 sequentially illustrates a method of manufacturing a magnetic recording medium according to the present invention.

FIG. 4 illustrates the method of manufacturing a magnetic recording medium according to the present invention. In this embodiment, fine concave and convex pattern of the metallic glassy layer 12 is formed by the nanoimprint method. At first, as shown in FIG. 4(A), a metallic glassy layer 12 having a predetermined thickness is formed on a substrate 11 by the evaporation using sputtering method etc.

Then, as shown in FIG. 4(B), concave portions and convex portions are formed on the metallic glassy layer 12 by the nanoimprint method using a mold 15. The mold 15 has convex portions 15A for forming concave portions 12B on the metallic glassy layer 12 and concave portions 15B for forming convex portions 12A on the metallic glassy layer 12. The method of manufacturing the mold 15 will be described later.

Amorphous alloys called as metallic glasses feature that the glass transition temperature Tg is lower than their crystallization temperature Tx, and there exists a stable supercooled liquid temperature region $\Delta Tx$ (=Tx−Tg). Within this supercooled liquid temperature region, since the metallic glass exhibits complete Newtonian viscosity flow, low-stress viscosity flow processing can be performed. This is the reason why the metallic glass has excellent micro-formability i.e. micro-configuration transfer property. According to the present embodiment, using this property of the metallic glass, micro concave portions and convex portions on the order of nm formed on the mold 15 are transferred to a metallic glassy layer 12, thus achieving highly accurate and easy micro-/nano-concave and convex formation.

In the process as shown in FIG. 4(B), the substrate 11, on which the metallic glassy layer 12 has been formed, and the mold 15 are heated up to the molding temperature Tm, which is higher than the glass transition temperature Tg of the metallic glassy layer 12, and a predetermined load is applied for a predetermined time, to form a metallic glassy layer 12 by imprint molding. The substrate 11 and the mold 15 are then cooled. When their temperature decreases to lower than the glass transition temperature Tg of the metallic glassy layer 12, the load is removed. Through these processes, the concave portions 12B having the depth of $t_1−t_2$ are formed on the metallic glassy layer 12 as shown in FIG. 4(C).

Then, as shown in FIG. 4(D), by annealing the amorphous layer of the metallic glass, the only surface of the convex portions 12A is crystallized to form a hard magnetic layer. Laser can be used for the heat treatment of the surface of the convex portions 12A.

Amorphous alloys, namely metallic glassy alloys represented by the above chemical composition formulas (1) to (3) can be used. For example, an amorphous alloy having the composition $Fe_{55}Pt_{25}Si_{16}B_2P_2$ can preferably be used. This alloy remains a soft magnetic layer in an amorphous state. When this alloy is processed by heat treatment, it is crystallized and turns into a hard magnetic layer consisting of Fe—Pt phase having $L1_0$ structure. Meanwhile, when a part of Pt is substituted by Pd, a hard magnetic layer made of Fe—Pd phase having $L1_0$ structure can be obtained through crystallization processed by the heat treatment.

Figure 5:
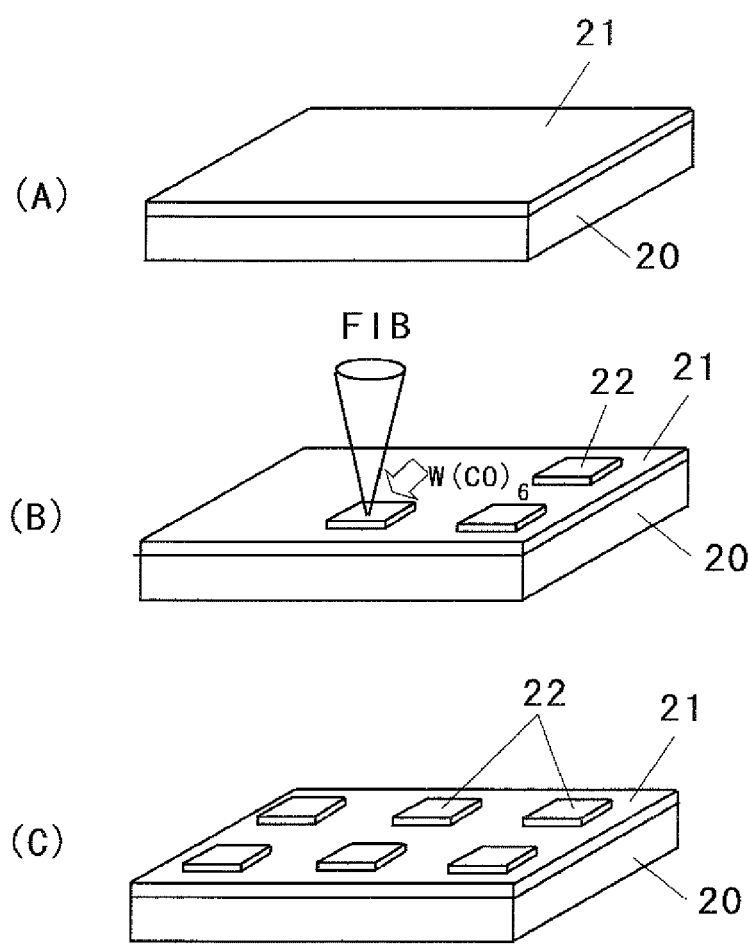
FIG. 5 illustrates a method of manufacturing a mold.
Figure 6:
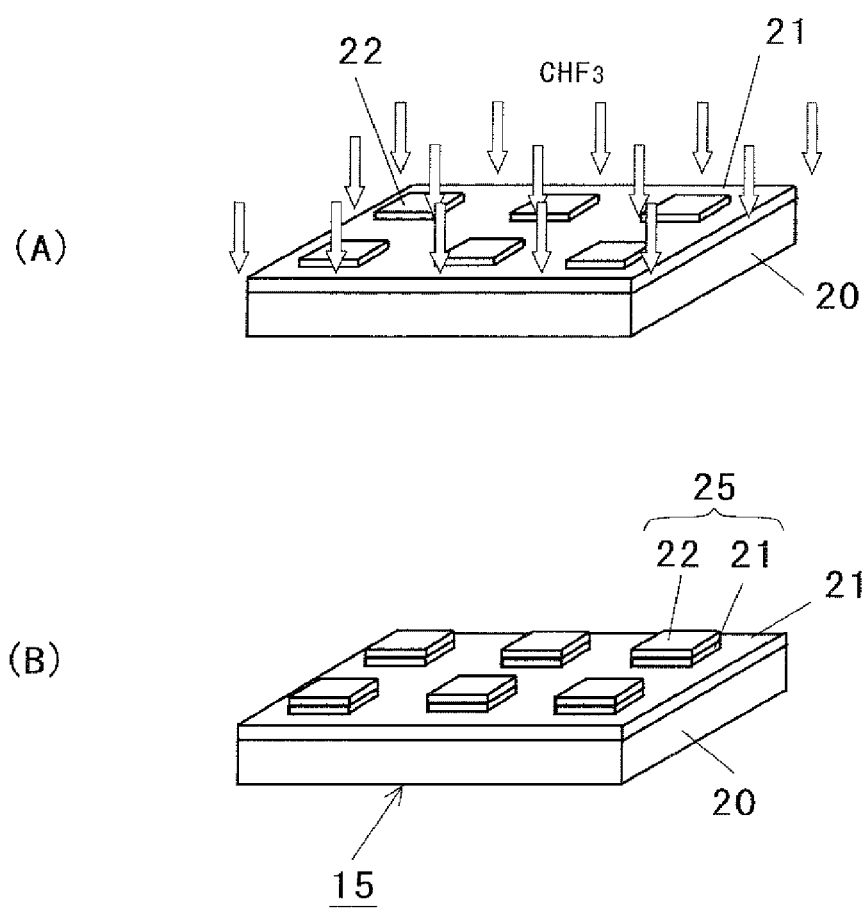
FIG. 6 sequentially illustrates the method of manufacturing the mold.

FIGS. 5 and 6 illustrate how to produce a mold 2. In the first process as shown in FIG. 5(A), a $SiO_2$ film 21 having a thickness of approximately 100 nm is formed on a surface of a Si substrate 20 having a (100) surface by the thermal oxidation method.

In the second process as shown in FIG. 5(B), a tungsten (W) thin film is formed on the $SiO_2$ film 21 by the focused ion beam chemical vapor deposition (FIB-CVD) method, and a mask pattern 22 is formed on the $SiO_2$ film 21. The patterning of this tungsten (W) thin film is processed by irradiating $Ga^+$ ion beam to the area to be processed while spraying gasified $W(CO)_6$ (tungsten hexacarbonyl). A deposited tungsten (W) film is formed on the surface of the $SiO_2$ film 21 by decomposition of the $W(CO)_6$ gas into W and CO. FIG. 5(C) illustrates a mask pattern made of a plurality of masks 22 formed on the $SiO_2$ film 21.

In the third process as shown in FIG. 6(A), using the tungsten mask pattern 22, the $SiO_2$ film 21 is etched anisotropically by reactive ion etching (RIE) with $CHF_3$. As shown in FIG. 6(B), a plurality of convex portions 25 that correspond to the concave portions 12B of the metallic glassy layer 12 are formed on the surface of the mold 15.

In the embodiment described above, the mold 15 which is formed by processing the Si substrate 20 by FIB was used, however a mold 15 made of metallic glass can also be used. In this case, a mother die is formed by processing the Si substrate 20 by FIB, and a mold 15 can be formed by imprinting the metallic glass using the mother die. The surface configuration i.e. concave portions and convex portions of the mother die should be identical to that of the metallic glassy layer 12 as shown in FIG. 1.

Example 1

The metallic glass of the present invention will be described further in detail by referring to various Examples below, but the Examples of the present invention are not limited to those described.

Using a mother alloy produced by melting in a radio-frequency melting furnace and an arc melting furnace, metallic glassy ribbons having the composition $Fe_{55}Pt_{25}Si_{13}B_5P_2$ was produced by the single-roll melt spinning method. The thermal property of a sample having a shape of ribbon of Example 1 was measured by the differential scanning calorimetry (DSC) to find the supercooled liquid region.

The "supercooled liquid region" determines the resistance to crystallization, namely the stability and processability, of amorphous material. In the present specification, the supercooled liquid region is defined as the difference between the glass transition temperature Tg and the crystallization temperature Tx, which can be obtained by conducting differential scanning calorimetry (DSC) at the heating rate of 40 K/min. The difference $\Delta Tx$ $(=Tx-Tg)$ between the crystallization start temperature Tx and the glass transition temperature Tg of the metallic glass in Example 1 was 25 K. The metallic glass in Example 1 exhibited enhanced amorphous-forming ability compared with FePtBP metallic glassy system to which Si was not added.

The sample of Example 1 was encapsulated into a quartz tube in vacuum, and was processed by the annealing for 900 seconds. Phase identification was performed by using X-ray diffraction (XRD), and magnetic property was measured by using a vibrating sample magnetometer (VSM).

By the heat treatment of the quenched ribbons of Example 1 at the temperature of 810 K or higher, a composite structure consisting of $L1_0$-FePt phase, $Fe_2B$ phase, PtSi phase, and FeSi phase was formed. In the metallic glass having the most excellent amorphous-forming ability, the residual magnetic flux density (Br), coercive force (Hc), and the maximum energy product ((BH)max) were approximately 0.69 T, 172 kA/m and 44 kJ/m³, respectively.

Example 2

The metallic glass in Example 2 was manufactured by the same method as Example 1, except that the chemical composition was changed to $Fe_{55}Pt_{25}Si_{16}B_2P_2$. $\Delta Tx$ $(=Tx-Tg)$ was found to be 37 K.

Figure 7:
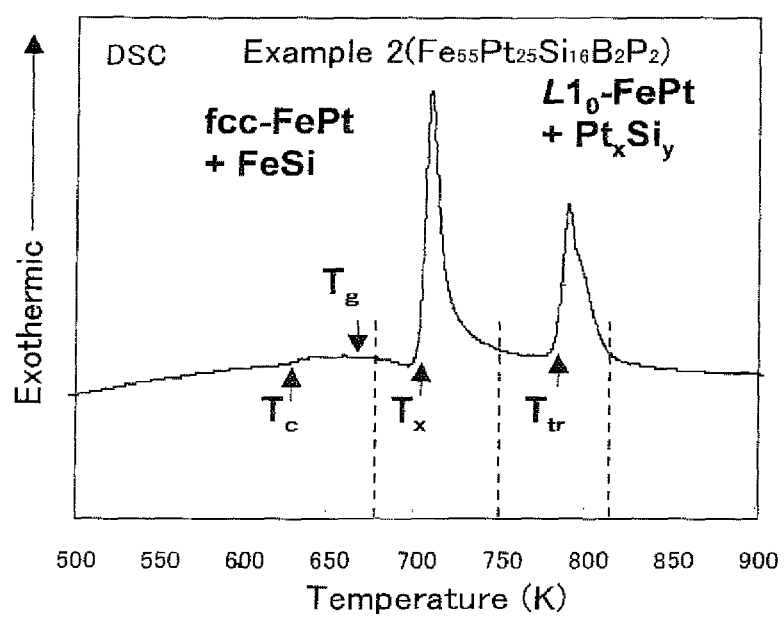
FIG. 7 is a chart illustrating the DSC trace of Example 2.

FIG. 7 is a chart illustrating the DSC trace of Example 2. The ordinate axis represents heat quantity and the abscissa axis represents temperature (K). In general, to examine phase transition phenomenon with a DSC trace, the exothermic reaction is observed. Meanwhile, in the metallic glass, taking into consideration the supercooled liquid region where the endothermic reaction is shown, the downward arrow on the ordinate axis is made to represent endotherm. As shown in FIG. 7, $\Delta Tx$ $(=Tx-Tg)$ of the metallic glass in Example 2 was 37 K.

Figure 8:
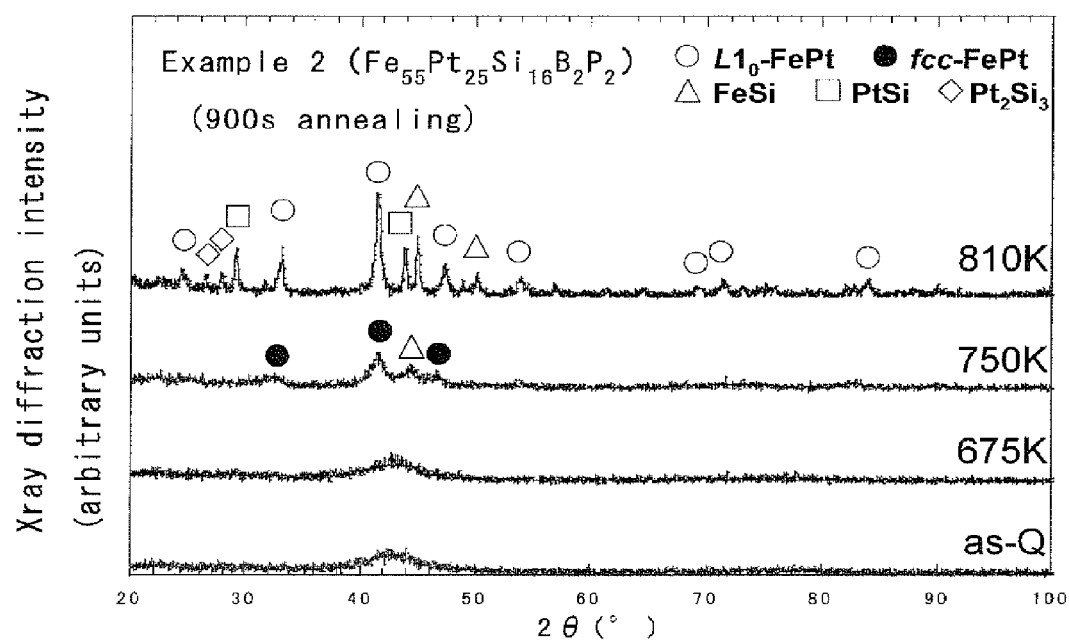
FIG. 8 is a chart illustrating the XRD profiles of Example 2.

FIG. 8 illustrates the XRD profiles of Example 2. The ordinate axis represents the intensity of X-ray diffraction, and the abscissa axis represents the angle (°), which is equivalent to the value twice the angle of incidence (θ) of X-ray into the atomic plane. FIG. 8 indicates that the metallic glass having the composition in Example 2 started precipitating crystalline phases with the increase of annealing temperature immediately after the formation of the metallic glass (as-Q), and that $L1_0$-FePt phase having a hard magnetic property was formed obviously at 810 K. It is understood that fcc-FePt phase, FeSi phase, and $Pt_2Si_3$ phase are formed in addition to the $L1_0$-FePt phase.

Figure 9:
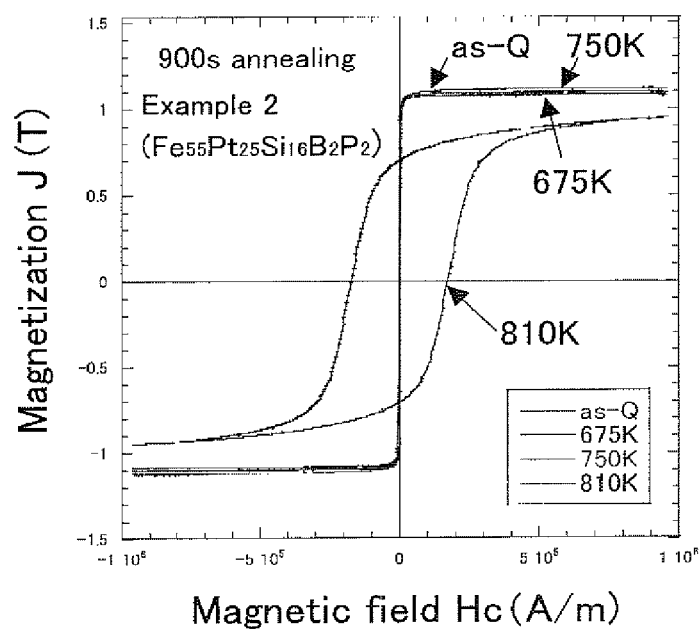
FIG. 9 is a chart illustrating the magnetization property of the metallic glass in Example 2.

FIG. 9 is illustrates the magnetization property of the metallic glass in Example 2. The ordinate axis represents magnetization J (T: Tesla), and the abscissa axis represents magnetic field Hc (A/m). As shown in FIG. 9, the metallic glass having the composition of Example 2 exhibited soft magnetic property through the heat treatment processed at 675 K and 750 K after the formation of the metallic glass (as-Q), and after the heat treatment processed at 810 K, hard magnetic property was obtained. It is also apparent that in case of B is 2%, the formation of Pt—Si phase is not isolated from the transformation of the Fe—Pt phase.

Figure 10:
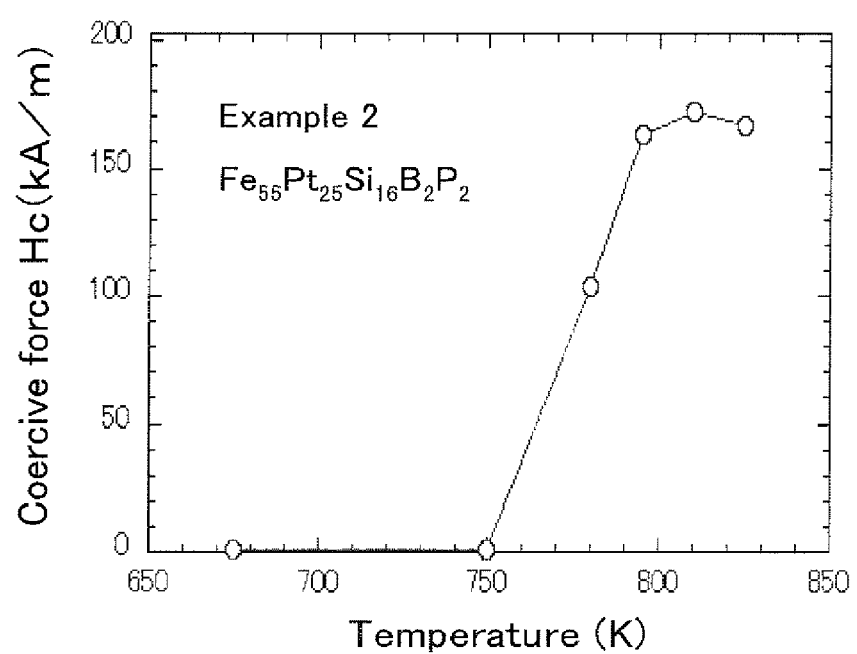
FIG. 10 is a chart illustrating the dependence of the coercive force of the metallic glass in Example 2 on the annealing temperature.

FIG. 10 illustrates the dependence of the coercive force of the metallic glass in Example 2 on the annealing temperature. The ordinate axis represents the coercive force Hc (kA/m), and the abscissa axis represents annealing temperature (K). The annealing time is 900 seconds. As shown in FIG. 10, the metallic glass having the composition of Example 2 exhibited hard magnetic property by the heat treatment processed at 750 K or higher after the formation of the metallic glass. It was also found that the coercive force ranging from 100 kA/m to 170 kA/m was obtained at the annealing temperature of approximately 780 K to 830 K.

Example 3

Figure 11:
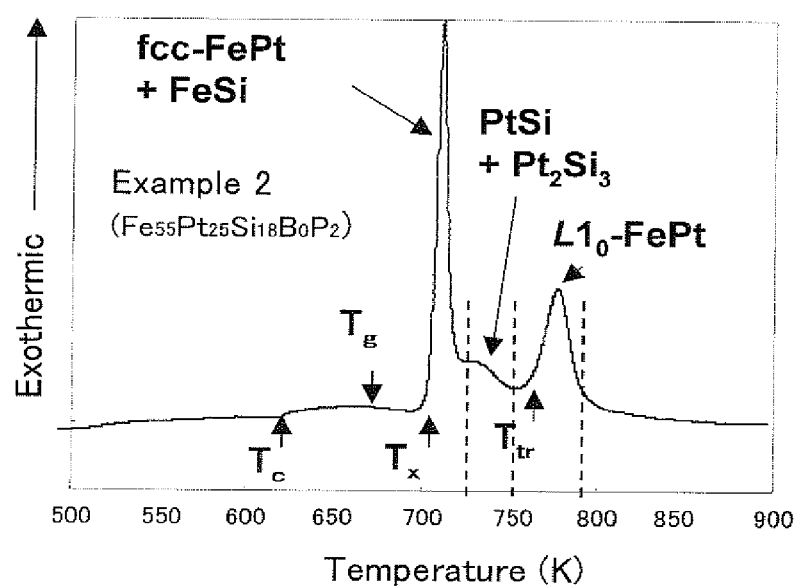
FIG. 11 is a chart illustrating the DSC trace of Example 3.

The metallic glass in Example 3 was manufactured by the same method as Example 1, except that the chemical composition was changed to $Fe_{55}Pt_{25}Si_{18}P_2$. FIG. 11 illustrates the DSC trace of Example 3. ΔTx was found to be 37 K.

Figure 12:
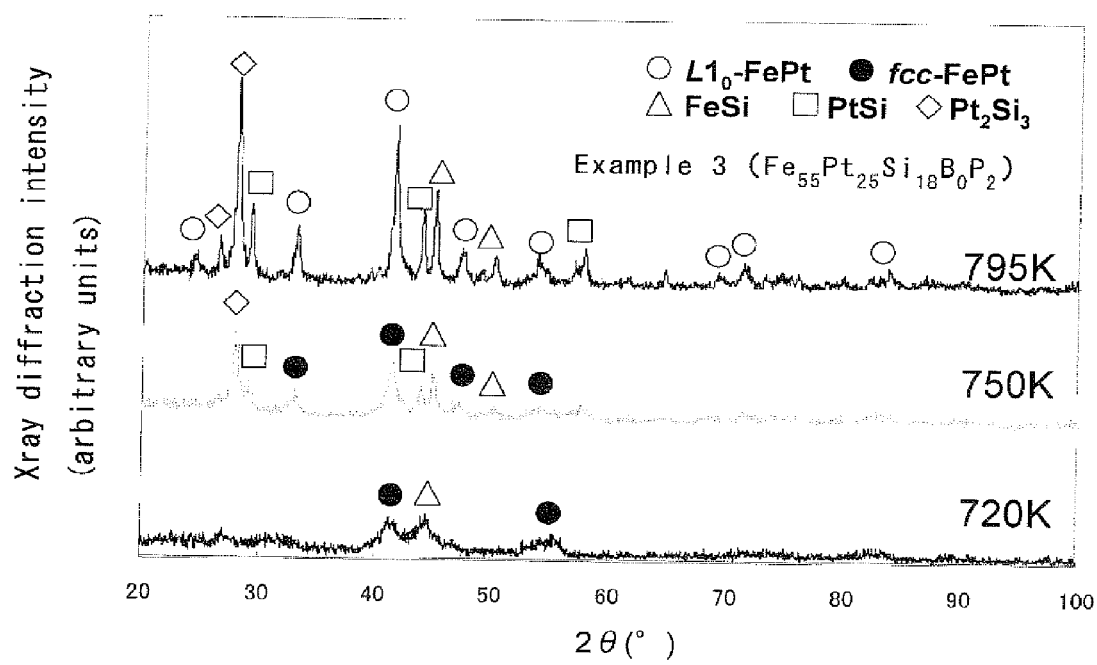
FIG. 12 is a chart illustrating the XRD profile of Example 3.

FIG. 12 illustrates the XRD profile of Example 3. The ordinate axis represents the intensity of X-ray diffraction, and the abscissa axis represents angle (°), which is equivalent to the value twice the angle of incidence θ of the X-ray into the atomic plane. FIG. 12 indicates that the metallic glass having the composition of Example 3 started precipitating crystalline phases with the increase of annealing temperature immediately after the formation of the metallic glass (as-Q), and that $L1_0$-FePt phase having a hard magnetic property was formed obviously at the temperature of 795 K. It is also obvious that fcc-FePt phase, FeSi phase, and $Pt_2Si_3$ phase were formed in addition to the $L1_0$-FePt phase.

Figure 13:
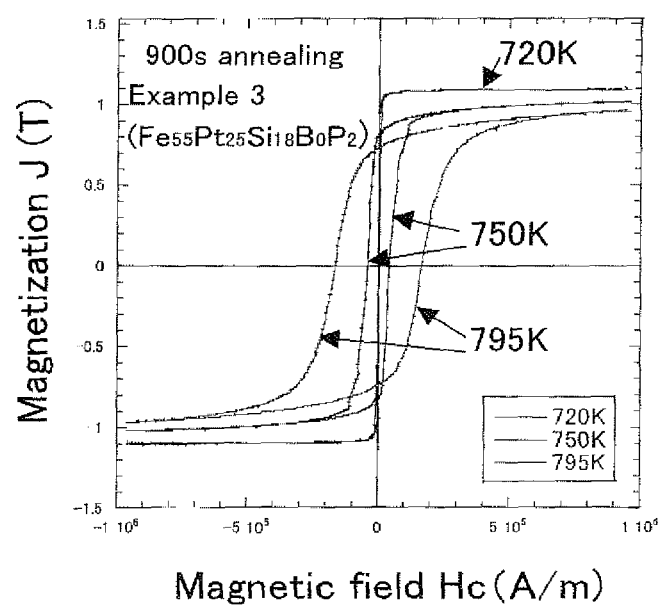
FIG. 13 is a chart illustrating the magnetization property of the metallic glass in Example 3.

FIG. 13 illustrates the magnetization property of the metallic glass of Example 3. The ordinate axis represents magnetization J (T: Tesla) and the abscissa axis represents magnetic field H (A/m). FIG. 13 indicates that the metallic glass having the composition of Example 3 exhibited soft magnetic property by the heat treatment processed at 750 K immediately after the formation of the metallic glass (as-Q), and that hard magnetic property was obtained after by the heat treatment processed at 795 K.

Figure 14:
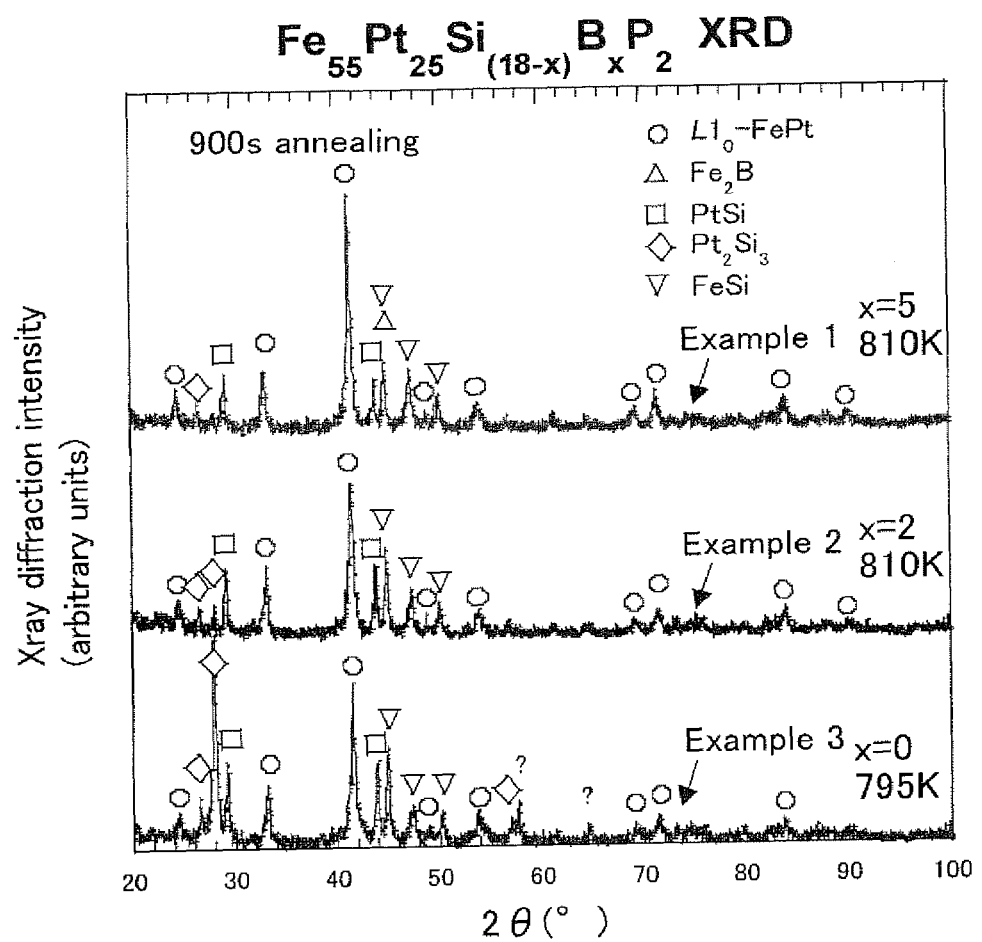
FIG. 14 is a chart collectively illustrating the XRD profiles of the metallic glasses in Examples 1 to 3.

FIG. 14 collectively illustrates the XRD profiles of the metallic glasses in Examples 1 to 3. It is apparent that $L1_0$-FePt crystalline phase was formed by the heat treatment processed at approximately 795 and 810 K.

Figure 15:
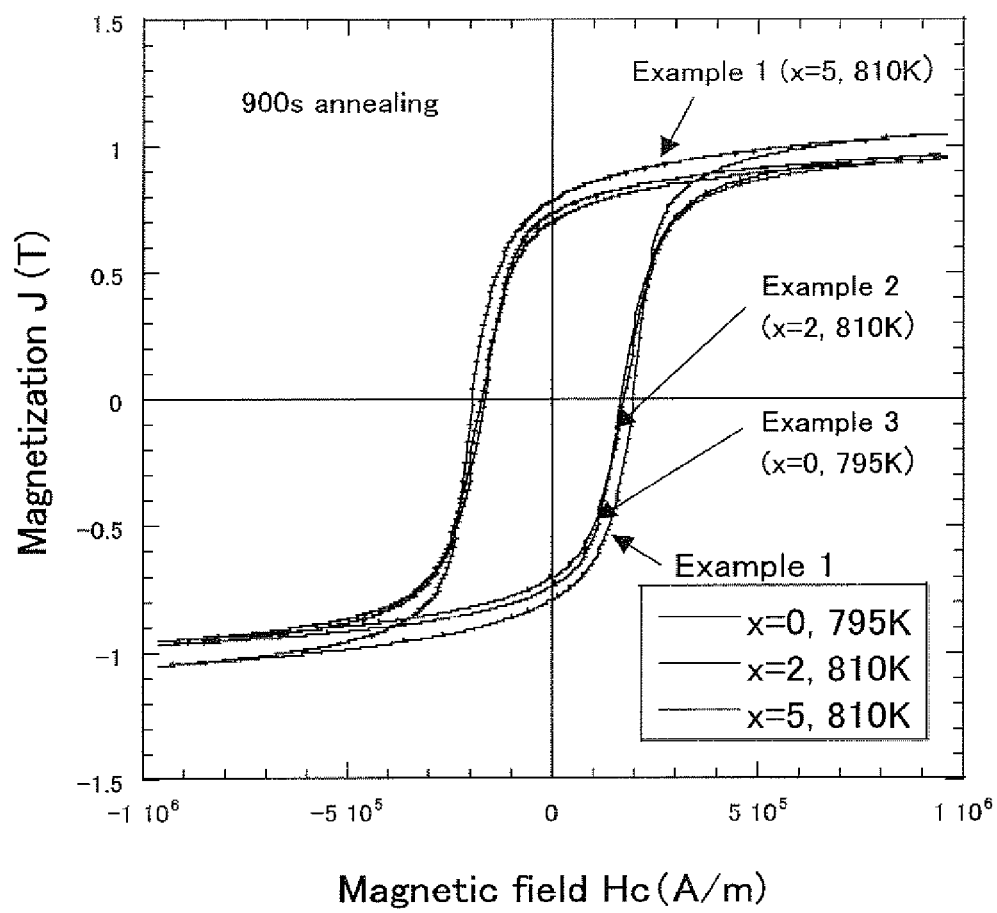
FIG. 15 is a chart collectively illustrating the magnetization properties of the metallic glasses in Examples 1 to 3.

FIG. 15 collectively illustrates the magnetization properties of the metallic glasses in Examples 1 to 3. It is obvious that the metallic glasses exhibited hard magnetic properties by the heat treatments processed at approximately 795 and 810 K.

Example 4

The metallic glass in Example 4 was manufactured by the same method as Example 1, except that the chemical composition was changed to $Fe_{55}Pt_{25}Si_{15}B_3P_2$. ΔTx was found to be 37 K.

Figure 16:
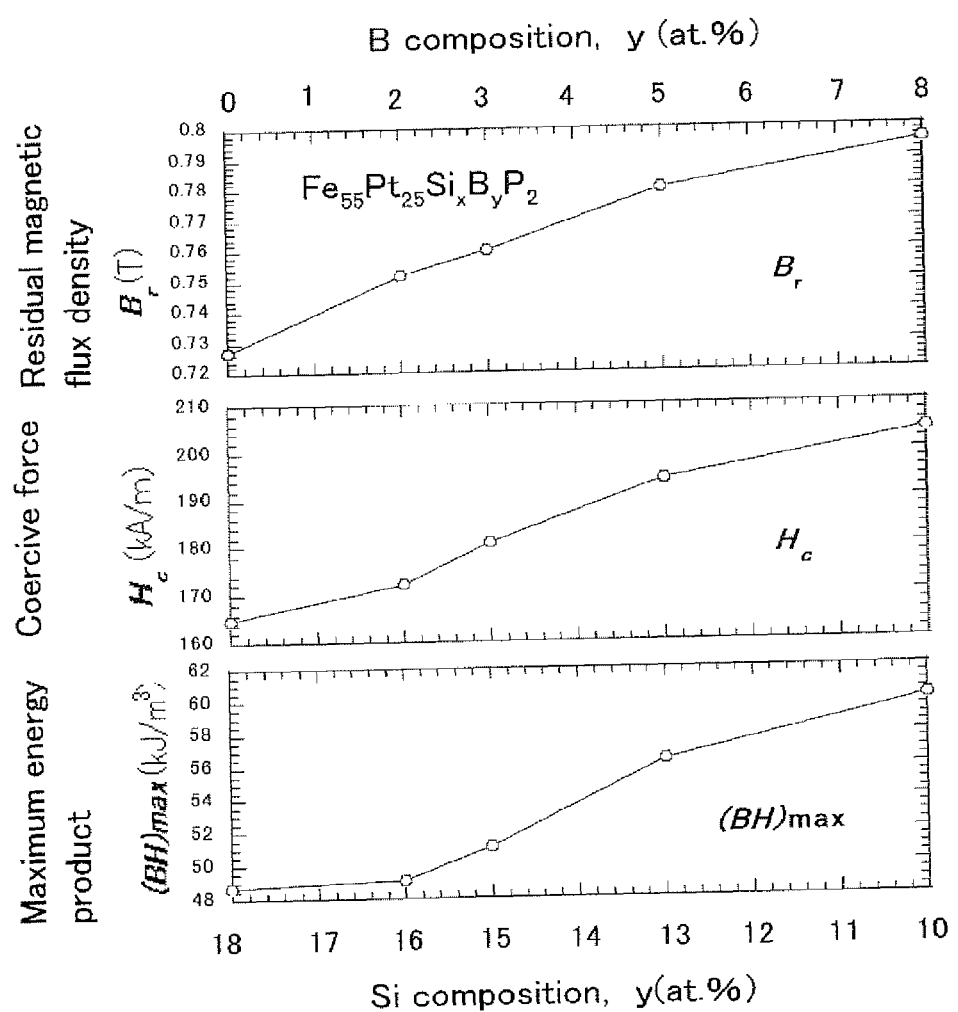
FIG. 16 is a chart illustrating the dependence of parameters on Si and B compositions obtained from the magnetization properties of the metallic glasses $Fe_{55}Pt_{25}Si_xB_yP_2$, in which (A) shows residual magnetic flux density, (B) shows coercive force, and (C) shows the maximum energy product $((BH)_{max})$.

FIGS. 16 (A) to 16(C) illustrate the dependence of residual magnetic flux density, coercive force, and the maximum energy product ((BH)max) on Si and B compositions obtained from the magnetization properties of the metallic glasses $Fe_{55}Pt_{25}Si_xB_yP_2$ in Examples 1 to 4. The upper abscissa axis represents B composition (at %) and the lower abscissa axis represents Si composition (at %). As shown in FIG. 16(A), residual magnetic flux density value of approximately 0.73 T to 0.8 T was obtained when Si composition varied from 18 at % to 10 at %.

As shown in FIG. 16(B), the coercive force of approximately 164 kA/m to 205 kA/m was obtained when Si composition varied from 18 at % to 10 at %.

As shown in FIG. 16(C), the maximum energy product of approximately 49 kJ/m³ to 60 kJ/m³ was obtained when Si composition varied from 18 at % to 10 at %.

Consequently, by varying Si and B compositions, the magnetic property of the metallic glass having the above composition; $Fe_{55}Pt_{25}Si_xB_yP_2$ can be changed.

Example 5

The metallic glass in Example 5 was manufactured by the same method as Example 1, except that the chemical composition was changed to $Fe_{55}Pt_{25}Si_{11}B_1P_8$. ΔTx was found to be 26 K.

Example 6

The metallic glass in Example 6 was manufactured by the same method as Example 1, except that the chemical composition was changed to $Fe_{55}Pt_{25}Si_{13}B_1P_6$. ΔTx was found to be 32 K.

Example 7

The metallic glass in Example 7 was manufactured by the same method as Example 1, except that the chemical composition was changed to $Fe_{55}Pt_{25}Si_{13}B_3P_4$. ΔTx was found to be 26 K.

Example 8

The metallic glass in Example 8 was manufactured by the same method as Example 1, except that the chemical composition was changed to $Fe_{55}Pt_{25}Si_{14}B_4P_2$. ΔTx was found to be 27 K.

Example 9

The metallic glass in Example 9 was manufactured by the same method as Example 1, except that the chemical composition was changed to $Fe_{55}Pt_{25}Si_{15}B_1P_4$. ΔTx was found to be 31 K.

Example 10

The metallic glass in Example 10 was manufactured by the same method as Example 1, except that the chemical composition was changed to $Fe_{55}Pt_{25}Si_{15}B_2P_3$. ΔTx was found to be 32 K.

Example 11

The metallic glass in Example 11 was manufactured by the same method as Example 1, except that the chemical composition was changed to $Fe_{55}Pt_{25}Si_{15}P_5$. ΔTx was found to be 17 K.

Example 12

The metallic glass in Example 12 was manufactured by the same method as Example 1, except that the chemical composition was changed to $Fe_{55}Pt_{25}Si_{16}B_3P_1$. ΔTx was found to be 23 K.

Example 13

The metallic glass in Example 13 was manufactured by the same method as Example 1, except that the chemical composition was changed to $Fe_{55}Pt_{25}Si_{17}B_3$. ΔTx was found to be 29 K.

It was found that in any Examples from 4 to 13, $L1_0$-FePt crystalline phases were produced by the heat treatment, and the hard magnetic properties were obtained.

Figure 17:
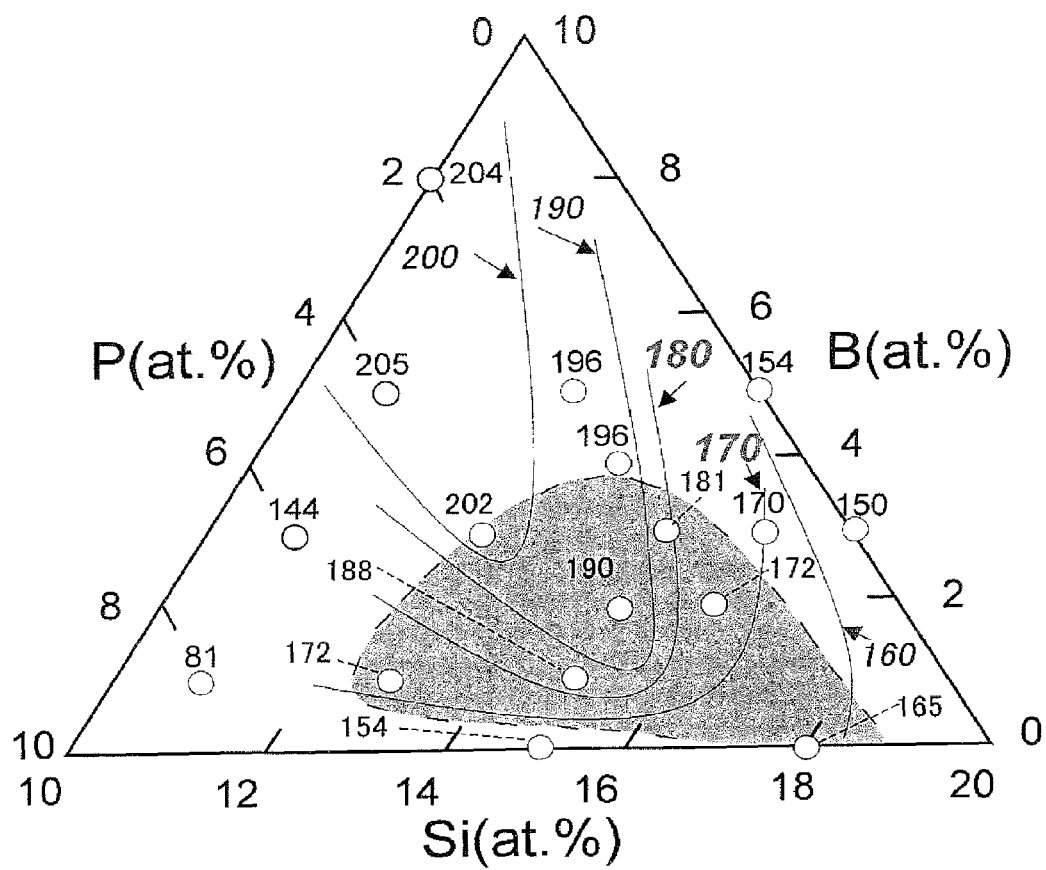
FIG. 17 illustrates the dependence of the coercive force of the metallic glass $Fe_{55}Pt_{25}(Si_xB_yP_z)$ on the composition of Si, B, and P in Examples 1 to 13.

FIG. 17 illustrates the dependence of the coercive force of the metallic glasses $Fe_{55}Pt_{25}(Si_xB_yP_z)$ on the compositions of Si, B, and P in Examples 1 to 13. The positions marked with open circles (○) exhibit the measured composition of the metallic glass, and the numeric values shown next to them represent the coercive force (kA/m). Each of the curves marked as 160 to 200 displays distributions of the coercive force.

It is obvious as shown in FIG. 17 that the high coercive force was obtained at composition z of P ranging from 2 to 4 at %.

Example 14

The metallic glass in Example 14 was manufactured by the same method as Example 1, except that the chemical composition was changed to $(Fe_{0.55}Pt_{0.25}Si_{0.16}B_{0.02}P_{0.02})_{96}Zr_4$.

Figure 18:
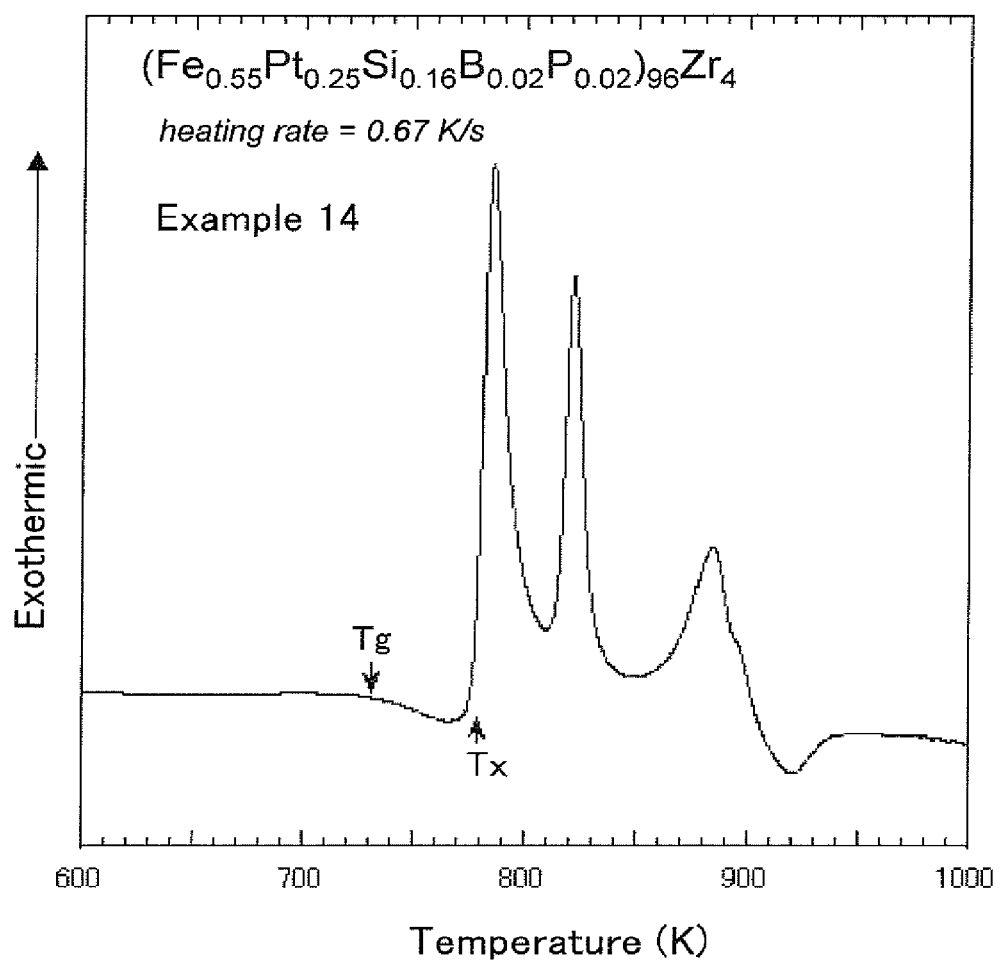
FIG. 18 is a chart illustrating the DSC trace of Example 14.

FIG. 18 illustrates the DSC trace of Example 14. The ordinate axis represents heat quantity and the abscissa axis represents temperature (K). In general, to examine phase transition phenomenon with a DSC trace, exothermic reaction is observed. Meanwhile, in the metallic glass, taking into consideration the supercooled liquid region where the endothermic reaction is shown, the downward arrow on the ordinate axis is made to represent endotherm. As shown in FIG. 18, $\Delta Tx$ (=Tx−Tg) of the metallic glass in Example 14 was 48 K.

From the above, $(Fe_{0.55}Pt_{0.25}Si_{0.16}B_{0.02}P_{0.02})_{96}Zr_4$ was found to be a metallic glassy alloy having a $\Delta Tx$ value as large as that of $Fe_{55}Pt_{25}(Si_xB_yP_z)_{20}$ (wherein, $11 \leq x < 19$ at %, $0 \leq y < 8$ at %, and $0 < z < 8$ at %). It was also found that the $L1_0$-FePt phase is generated by annealing at 800 K for 900 seconds, and that hard magnetic property was obtained.

Comparative Examples are explained below.

Comparative Example 1

The alloy in Comparative Example 1 was manufactured by the same method as Example 1, except that the chemical composition was changed to $Fe_{55}Pt_{25}Si_8B_8P_4$. The DSC trace revealed that this alloy was not a metallic glass.

Comparative Example 2

The alloy in Comparative Example 2 was manufactured by the same method as Example 1, except that the chemical composition was changed to $Fe_{55}Pt_{25}Si_{10}B_8P_2$. The DSC trace revealed that this alloy was not a metallic glass.

According to Examples and Comparative Examples described above, it is identified to be able to manufacture metallic glasses having a large $\Delta Tx$ in $Fe_{55}Pt_{25}(Si_xB_yP_z)_{20}$ (wherein, $11 \leq x < 19$ at %, $0 \leq y < 8$ at %, and $0 < z < 8$ at %) and $(Fe_{0.55}Pt_{0.25}Si_{0.16}B_{0.02}P_{0.02})_{96}Zr_4$. It is obvious that the crystalline phase of $L1_0$-FePt can be generated by the heat treatment and that the hard magnetic property can be obtained.

The embodiments of the present invention are not limited to those described above. Various modifications are possible without departing from the scope of claims of the present invention. It is needless to say that those modifications are also included in the scope of the present invention.

What is claimed is:

1. A metallic glass comprising a chemical composition of said metallic glass is represented by the formula (1):

$Fe_mPt_nSi_xB_yP_z$ (wherein, $20 < m \leq 60$ at %, $20 < n \leq 55$ at %, $11 \leq x < 19$ at %, $0 \leq y < 8$ at %, and $0 < z < 8$ at %)     (1), wherein said metallic glass has the hard magnetic property.

2. The metallic glass as set forth in claim 1, wherein the chemical composition is represented by the formula (2):

$Fe_{55}Pt_{25}(Si_xB_yP_z)_{20}$ (wherein, $11 \leq x < 19$ at %, $0 \leq y < 8$ at %, and $0 < z < 8$ at %)     (2).

3. A metallic glass comprising a chemical composition is represented by the formula (3):

$(Fe_{0.55}Pt_{0.25}Si_{0.16}B_{0.02}P_{0.02})_{100-x}M_x$ (wherein, $0 < X \leq 6$ at %; and M represents an element or a combination of any two of more of the elements selected from Zr, Nb, Ta, Hf, Ti, Mo, W, V, Cr, Mn, Al, Y, Ag, and rare earth elements)     (3), wherein said metallic glass has the hard magnetic property.

4. The metallic glass as set forth in any one of claims 1 to 3, wherein a part of Fe is substituted by Co or Ni.

5. The metallic glass as set forth in claims 1 to 3, wherein a part of Pt is substituted by Pd.

6. The metallic glass as set forth in any one of claims 1 to 3, wherein a ribbon of said metallic glass has a thickness of several μm to several dozen μm.

7. The metallic glass as set forth in any one of claims 1 to 3, wherein said metallic glass is a form of powder.

8. The metallic glass as set forth in claim 1 or 2, wherein said metallic glass has the composition selected from any one of $Fe_{55}Pt_{25}Si_{13}B_5P_2$, $Fe_{55}Pt_{25}Si_{16}B_2P_2$, $Fe_{55}Pt_{25}Si_{18}P_2$, $Fe_{55}Pt_{25}Si_{15}B_3P_2$, $Fe_{55}Pt_{25}Si_{11}B_1P_8$, $Fe_{55}Pt_{25}Si_{13}B_1P_6$, $Fe_{55}Pt_{25}Si_{13}B_3P_4$, $Fe_{55}Pt_{25}Si_{14}B_4P_2$, $Fe_{55}Pt_{25}Si_{15}B_1P_4$, $Fe_{55}Pt_{25}Si_{15}B_2P_3$, $Fe_{55}Pt_{25}Si_{15}P_5$, $Fe_{55}Pt_{25}Si_{16}B_3P_1$, and $Fe_{55}Pt_{25}Si_{17}B_3$.

9. The metallic glass as set forth in claim 8, wherein a supercooled liquid temperature region $\Delta Tx$ (=Tx−Tg) is ranged from 17K, 23K, 25K, 31K, 32K, and 37K.

10. The metallic glass as set forth in claim 8, wherein said metallic glass has a composite structure consisting of $L1_0$-FePt phase, $Fe_2B$ phase, PtSi phase, and FeSi phase.

11. The metallic glass as set forth in claim 8, wherein said metallic glass has a composite structure consisting of $L1_0$-FePt phase, fcc-FePt phase, FeSi phase, and $Pt_2Si_3$ phase.

12. The metallic glass as set forth in claim 3, wherein the M represents Zr.

13. The metallic glass as set forth in claim 3, wherein said metallic glass has the composition of $(Fe_{0.55}Pt_{0.25}Si_{0.16}B_{0.02}P_{0.02})_{96}Zr_4$.

14. The metallic glass as set forth in claim 13, wherein a supercooled liquid temperature region $\Delta Tx$ (=Tx−Tg) is 48K.

15. The metallic glass as set forth in claim 13, wherein said metallic glass has a composite structure consisting of $L1_0$-FePt phase.

* * * * *